United States Patent [19]
Ryan

[11] Patent Number: 6,082,061
[45] Date of Patent: Jul. 4, 2000

[54] STAIR TREAD

[76] Inventor: Alex L. Ryan, 2316 Crown Colony Dr., Arlington, Tex. 76011

[21] Appl. No.: 09/234,006

[22] Filed: Jan. 19, 1999

[51] Int. Cl.7 .................................................... E04F 11/00
[52] U.S. Cl. ................................ 52/188; 52/182; 52/630; 52/309.1; 52/745.19
[58] Field of Search ............................ 52/177, 179, 182, 52/188, 191, 309.12, 630, 745.19

[56] References Cited

U.S. PATENT DOCUMENTS

| | | | |
|---|---|---|---|
| 2,994,417 | 8/1961 | Nagin | 52/179 |
| 3,021,928 | 2/1962 | Blair | 52/191 |
| 3,834,098 | 9/1974 | Wutzke | 52/189 |
| 3,897,665 | 8/1975 | Yokomori | 52/188 |
| 3,932,972 | 1/1976 | Rossman | 52/183 |
| 3,978,628 | 9/1976 | Turner | 52/188 |
| 4,873,802 | 10/1989 | Dahowski | 52/184 |
| 5,357,724 | 10/1994 | Sonoda | 52/182 |

*Primary Examiner*—Christopher T. Kent
*Assistant Examiner*—Jennifer I. Thissell
*Attorney, Agent, or Firm*—Daniel R. Brown

[57] ABSTRACT

A stair tread and method of manufacturing same is disclosed. The stair tread comprises a rigid frame which is encapsulated with a structural plastic material. In the preferred embodiment, the rigid frame is made from steel and the encapsulating structural plastic is a polyol and isocyanate blend which is applied to the rigid frame by the reaction injection molding process. The stair tread exhibits the advantages of a bar grating stair tread and the corrosions resistance of a plastic stair tread while being low cost and efficient to manufacture.

5 Claims, 3 Drawing Sheets

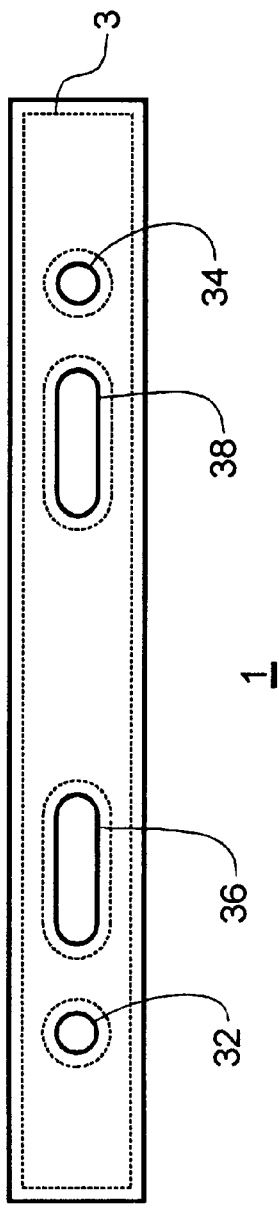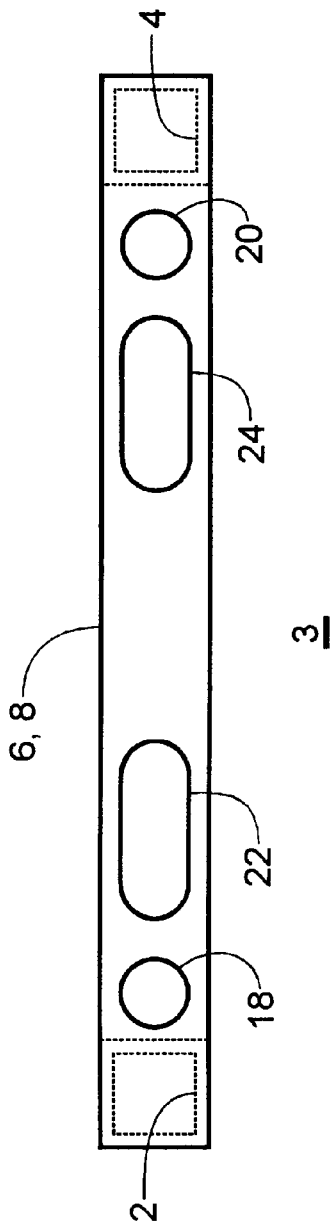

STAIR TREAD

TECHNICAL FIELD OF THE INVENTION

This invention relates to stair treads. More particularly, this invention relates to an improved stair tread of composite structure and suitable for harsh environments.

BACKGROUND OF THE INVENTION

Stair tread are commonly used in vast numbers in residential and commercial facilities, such as homes, apartments, stores and publicly accessible structures. Many materials are utilized in stair tread construction including woods, metals, stone, concrete, and others. Stair treads are used in both indoors and outdoors applications. The foregoing uses of stair treads share a common attribute in that the environmental considerations are relatively benign. Loading of such stair treads is largely limited to normal foot traffic.

Industrial applications of stair treads, such as in factories, industrial plants, shops, chemical plants, marine facilities, and etc., are more severe. In addition to heavier structural loads, including both foot traffic and equipment, industrial stair treads may be subject to shock loads and greater extremes of heat and moisture. Also, chemicals, both caustic and acidic, may corrode stair tread materials. Abrasive materials may also play a role in aggravating the wear and tear by abrasion and erosion on such stair treads.

A typical stair case installation includes a pair of stringer beams ("stringers") connecting a first level surface to a second level surface. The stingers are typically inclined at an angle suitable for the placement of stair treads of such rise and run to accommodate a normal walking gate to climb or descend the stair case. Stair treads are disposed between the stringers and are attached by various means to securely locate the stair treads. Stringer beams are designed of a structural cross sections and from a material so as to provide adequate structural support for the span and maximum design loading of the stair case which they form. The stair treads span a distance between the stringer beams that may range from as little as perhaps sixteen inches to four feet or more. A typical stair tread width being approximately thirty-six inches.

In industrial applications, stringers are often fabricated from structural steel "C" channel or other fabricated sections. Stair treads are commonly fabricated from several materials and are of several designs, including mild steel plates, mild steel bar grating, concrete, fiberglass reinforced plastic ("FRP"), also aluminum and stainless steel are used. In the design of industrial stair treads, several criteria need to be considered. These criteria include: the cost of the material; the strength of the material; the weight of the material; the material's resistance to wear and abrasion; the material's resistance to corrosion; the material's reaction to extremes of temperature, particularly fire; the ability of the material to provide traction to the user of the stair tread; the ability of the stair tread to remain clean; the characteristics of the stair tread as it wears out, aesthetics, and other considerations.

For industrial applications, mild steel plate is often chosen as a stair tread material because it is a relatively inexpensive material and its characteristics in fabrication are well known and developed. Sometimes, so called 'diamond' or 'checker' plate are used for better traction on the walking surface. However, mild steel plate has several limitations in that it is relatively heavy, prone to corrosion, and provides poor traction, especially as it wears. Also, the plate must be relatively thick to provided adequate strength on wider stair tread applications. Mild steel plate tends to accumulate dirt and debris on its surfaces, further reducing traction and increasing the safety risk to users.

Mild steel bar grating stair treads, which are also commonly used, are an improvement over mild steel plate. Bar grating stair treads utilize a plurality of mild steel bars that act as beams which span the width of the stair tread. These beams are interconnected with a plurality of brace bars which locate and reinforce the beams. Together, these beams and braces form a grate structure which is strong. The openings in the grate structure make the tread self cleaning and afford a degree of visual access through a stair case. The fabrication costs of bar grating stair treads is increased as compared to plates. At each intersection of the beams and braces, a connection, typically a weld, must be made. Such a stair tread is also comprised of a large number of individual pieces which must be fabricated in turn. Also, bar grating stair treads suffer from the corrosion and weight problems, such as are related to all mild steel stair treads.

In an effort to overcome the corrosion problems related to mild steel, while retaining the advantages of a bar grating stair tread, others have devised fiberglass reinforced plastic ("FRP") stair treads. Such stair treads are fabricated in a form, or mold, into which fiberglass roving is laid into place. Each beam and brace in the grate must have fiberglass roving. The mold is then filled with plastic or epoxy and cured to form the FRP grate stair tread. Such treads do yield some of the advantages and benefits of steel bar grating treads including the self cleaning nature and general advantages of a grate design. The desired resistance to corrosion is also achieved by use of plastic material. However, FRP stair treads suffer from some important disadvantages which include: high fabrication costs due to the complex nature of the design; low production yields due to the slow fiberglass roving laying process and slow cure times; relatively high weight due to the need to use large bar cross sections necessary to achieve the needed strength, and inadequate resistance to fire exposure. In fact, fiberglass stair treads will completely fail after exposure to fire.

FRP stair treads have further disadvantages during installation. The attachment of the stair tread to the stringer requires the use of nuts, bolts, washers, angle clips, or other brackets in order to adequately support the stair tread. It is not sufficient to merely drill a hole and insert a bolt through the outermost brace because each individual brace does not exhibit adequate strength to support the load of the whole stair tread. Rather, a support shelf must be utilized to distribute the loading over a plurality of the beams/braces in the FRP stair tread. Since one of the goals is corrosion resistance, these attachment items are usually made from stainless steel where harsh chemical environments are involved. This can result in a very expensive stair tread installation, as compared to mild steel designs.

It should be noted that corrosion resistance can be achieved in a metal plate or metal bar grating stair tread by substituting stainless steel for mild steel. However this is rarely done in practice due to the extremely high costs of both material and fabrication in stainless steel.

Clearly there is a need for an industrial stair tread which is low cost, strong, corrosion resistant, withstands wear, is serviceable during or after fire, is easily fabricated in high volume, and offers the various advantages of a bar grating and/or plate type stair tread designs.

SUMMARY OF THE INVENTION

The present invention is a stair tread of composite design such that it provides the benefits of a bar grate and/or plate type design, the strength of steel, corrosion resistance of plastics or resins, low cost, low weight, and low cost of fabrication and installation.

A rigid frame is fabricated from a suitably strong and low cost material, such as mild steel. The frame takes the basic shape of the finished stair tread. The frame is then encapsulated in a structural plastic material. The frame may be an open frame of beams and braces, or it may be a plate type frame if suitable for the application. The plastic completely encapsulates the rigid frame, thereby protecting the rigid frame from corrosive attach by chemical agents. The natural corrosion resistance of the plastic material is thereby advantageously utilized.

Since the encapsulating rigid plastic has structural integrity, certain portions of the stair tread may be formed without the presence of a member of the aforementioned rigid frame. The rigid frame can thereby be made more simply, having fewer beams and braces than would customarily be needed in a bar grate design, or with less metal forming than would be needed in a metal plate design stair tread. Furthermore, a beam and brace rigid frame may be used which is then encapsulated such that a plate type stair tread if formed by utilizing the structural plastic to bridge the openings in the beams and braces of the rigid frame, thereby forming a plate of structural plastic on at least the upper, or walking, surface of the finished stair tread.

While many encapsulation techniques could be employed, in the preferred embodiment, polyol and isocyanate compounds are mixed to form polyurethane just prior to being forced into a relatively low pressure, low temperature mold, into which the rigid frame has previously been inserted. The compound quickly cures, in a time period of a few minutes, by chemical reaction and the preferred embodiment stair tread is removed, rendering the mold ready for another stair tread without delay. This allows for fast production and efficient utilization of the production equipment.

The use of and encapsulating structural plastic also allows for the molding of anti-slip surface patterns, anti-slip adjunct surface materials, the addition of coloring agents and also in-mold painting. This allows the stair tread to be easily visible and safe for use in a variety of environments.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

FIG. 2 is an end view of the rigid frame in the preferred embodiment.

FIG. 3 is an end view of the preferred embodiment stair tread.

DETAILED DESCRIPTION

Figure 1:
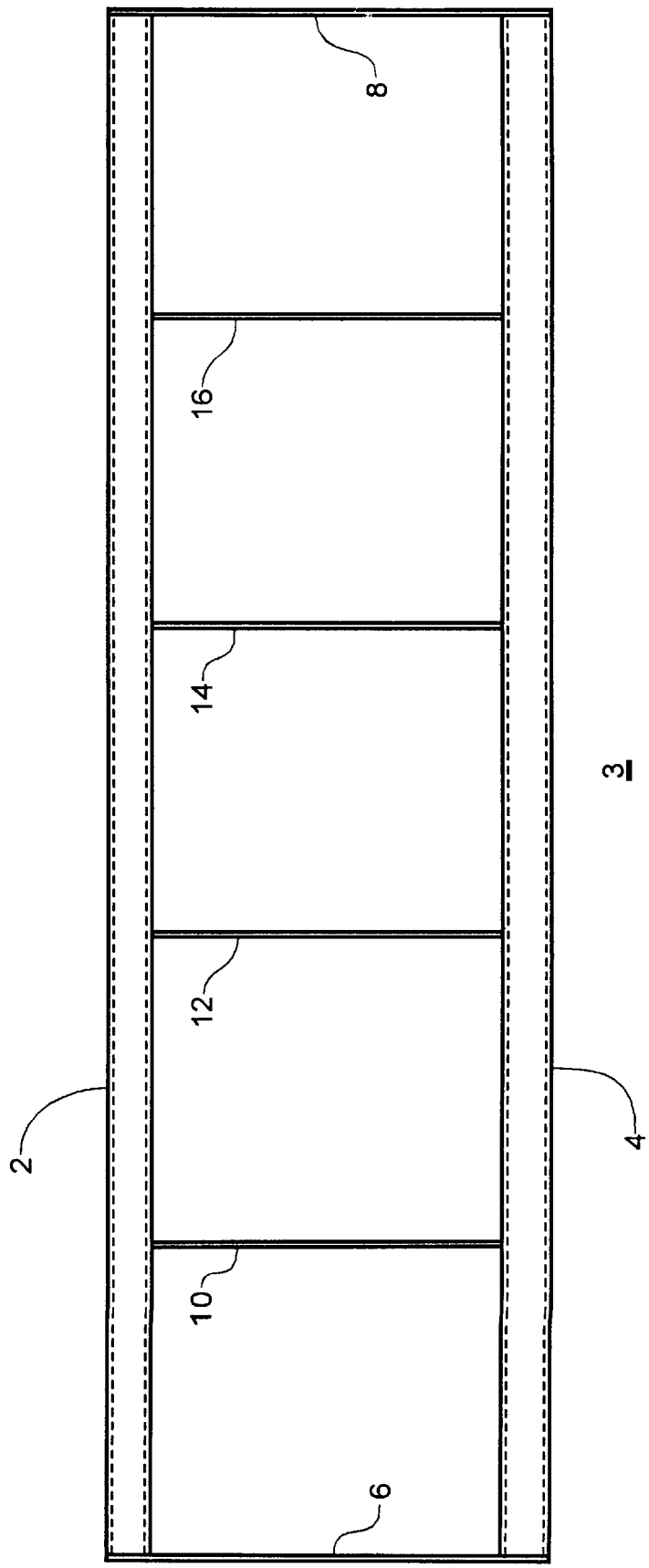
FIG. 1 is a top view of the rigid frame in the preferred embodiment.

Reference is directed to FIG. 1 which is a top view of the rigid frame 3 in the preferred embodiment. The rigid frame 3 is fabricated from mild steel and is of welded construction.

A first steel beam 2 of one inch square ten, twelve, or fourteen gauge mild steel tubing is arranged substantially parallel to a second steel beam 4 which is also made from similar one inch square mild steel tubing. The space between beams 2 and 4 establishes the depth, or run, of the stair tread, which may be approximately ten inches in a typical application. The length of the beams 2 & 4 establishes the width of the stair tread, which may be approximately thirty-six inches in a typical application. While other structural shapes could be used for the beams 2 & 4, such as angle iron, 'C'-channel, 'Z' channel, and etc., the square tube is preferred because it has good structural characteristics, allows the stair tread to be oriented such that any of the four lateral edges may be positioned as the tread nose, and because the square tube creates a void which need not be filled with the structural plastic encapsulating material, described hereinafter.

The beams are interconnected by two end plates 6 & 8 and four braces 10, 12, 14, & 16. Each of the braces and end plates are fabricated from one inch wide, ten, twelve, or fourteen gauge mild steel plate. The one inch width matches the one inch depth of the beams, 2 & 4. It is obvious that other sizes or gauges of beams and braces could be utilized, depending on the desired structural characteristics. Each of the interconnecting braces and plates is welded to each of the beams. The end plates 6 & 8 are long enough to extend over the open end of the beams 2 & 4. The welded joint between the end plates 6 & 8 and the beams 2 & 4 are continuous all around the open end of the beams. In this way, an air tight void is created within the beams 2 & 4 such that when the encapsulating structural plastic is molded onto the rigid frame, the void will not be filled with the plastic, thereby saving the amount of material that would otherwise be required to fill the void. The braces 10, 12, 14, & 16 are spaced uniformly along the width of the rigid frame 3. It is obvious that any suitable number of braces could be employed, depending on the desired structural characteristics. Minimizing the number of braces reduces the manufacturing cost of the stair tread.

In the preferred embodiment the rigid frame 3 is designed to be sufficiently strong to support weight and maintain accessibility of a stair case without the presence of the encapsulating structural plastic. This creates an added degree of integrity of the stair tread and stair case in the event the encapsulating structural plastic is rendered ineffective, as by melting in extreme heat or fire, for example.

Reference is directed to FIG. 2 which is an end view of the rigid frame 3 in the preferred embodiment. In particular, this view depicts detail in the end plates 6 & 8. The end plates 6 & 8 provide the attachment points for the finished stair tread. Just adjacent to the beams 2 & 4 are located two mounting holes 18 & 20 in the end plates 6 & 8. Just adjacent to the mounting holes 18 & 20 are two mounting slots 22 & 24. In application, the preferred embodiment stair tread can be mounted with two bolt-nut-washer sets on each end of the stair tread by either using the two mounting holes 18 & 20 or the two mounting slots 22 & 24, or any combination thereof. The holes 18 & 20 are provided for precise location of the stair tread in the case where the stringer is prefabricated with reasonable precision. In the case where the preferred embodiment stair tread is field installed or retrofitted, the mounting slots 22 & 24 provide for a degree of adjustment in the final location of the preferred embodiment stair tread. In addition, the preferred embodiment stair tread can be installed in retrofit situations by utilizing existing mounting brackets or mounting shelves which may already be present from the previous stair tread. This represents and additional cost saving and added flexibility of the present invention.

It should be noted that the end plates 6 & 8 are symmetrical about the vertical and horizontal axes, as depicted in FIG. 2. This allows the preferred embodiment stair tread to be installed and relocated so that any of the four lateral edges of the stair tread may serve as the nosing of the stair tread. This is beneficial because all stair treads naturally wear with use over time. The principle area of wear is typically the tread nose. By incorporating the aforementioned symmetry, the preferred embodiment tread can be flipped and/or rotated to expose any of the four lateral surfaces, thereby effectively extending the useful life of the stair tread. Since the preferred embodiment stair tread is typically bolted to the stringers, such adjustment can be accomplished easily with readily available tools.

Figure 4:
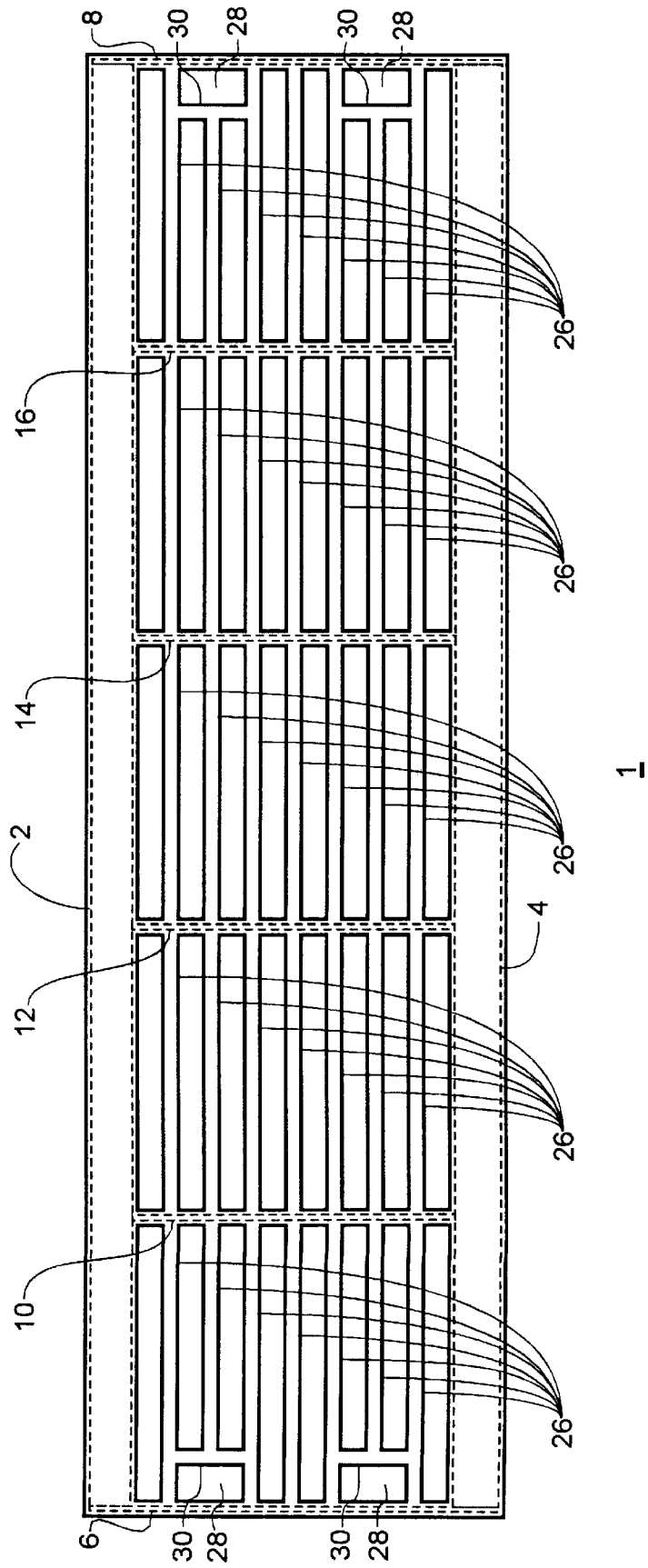
FIG. 4 is a top view of the preferred embodiment stair tread.

Reference is directed to FIG. 4 which is a top view of the encapsulated stair tread 1 in the preferred embodiment. The stair tread 1 is fabricated by inserting the rigid frame, item 3 of FIG. 1, into a mold and then injecting a blend of polyol and isocyanate compounds which chemically react to form a polyurethane structural plastic encapsulating material. This type of molding process is know by those skilled in the art as reaction injection molding ("RIM"). While it will be obvious to those skilled in the art to use many other plastic molding techniques, including thermoset plastics and other blended plastic compounds, the reaction injection molding process is preferred for reasons set forth hereinafter.

The RIM process includes injecting a blend of polyol and isocyanate into a mixing chamber at high pressure which mixes these compounds by impingement. The mixed material then flows into a cavity mold at relatively low pressure and temperature and quickly cures by chemical reaction of the aforesaid components. The latitude of formulations available in polyurethane chemistry affords a wide range to physical and chemical properties to the encapsulating structural plastic. In the preferred embodiment, Bayer, A.G. elasotmeric RIM polyurethanes are employed. These materials are selected because of their superior impact strength, toughness and durability, resistance to abrasion, and tearing. All of which are qualities desirable in a stair tread. It will be realized by those skilled in the art that other suppliers of similar and competitive RIM molding materials are available from alternative suppliers.

Since the molds operate at low temperature and low pressure, the stresses on the molds are less than in other molding processes and therefore the molds for RIM fabricated stair treads can be fabricated from lower cost materials, such as steel, machined or cast aluminum, kirksite or nickel shell. These options allow for a relatively inexpensive mold to be produced. The RIM process also allows for the encapsulation of the rigid frame and application if in-mold paint and finishing capabilities, including surface texturing for anti-skid protection. Another beneficial characteristic of this molding process is that a double mold can be operated to produce at least forty stair treads per hour, holding down the cost of producing the stair treads.

Stair treads which are encapsulated with a polyol and isocyanate blend in the RIM process exhibit excellent resistance to inorganic and organic acids and to many other potentially damaging materials and chemicals, including aliphatic hydrocarbons and a large number of solvents. These properties produce a stair tread that is useable in a large variety of harsh environments. By varying the formulation of the polyurethane, the structural characteristics of the encapsulating plastic can be controlled to produce the needed physical and chemical characteristics of the stair tread.

Reference is again directed to FIG. 4. The rigid frame is visible in phantom in this view, including the beams 2 & 4, the braces 10, 12, 14 & 16, and the end plates 6 & 8. To complete the stair tread 1, the entire rigid frame 3 has been encapsulated with structural plastic. In addition, the RIM mold has cavities form within it which form additional ribs 26 made entirely from the structural plastic. These ribs 26 as disposed between the braces 10, 12, 14 & 16, and also disposed between endplate 6 and brace 10 and between end plate 8 and brace 16. The ribs 26 are spaced on approximately one inch centers and have a rectangular cross section with a web thickness of approximately ⅜ inches. This leaves a gap between the ridges of about ⅝ inches which is suitable for such a bar grate type of stair tread. The cross section of each rib 26, and of the encapsulated rigid frame 3 are slightly tapered to allow easy release from the mold. This concept is well understood by those skilled in the art of molding.

Reference is directed to FIG. 3 which is an end view of the preferred embodiment stair tread 1. The rigid frame 3 is shown in phantom within stair tread 1. The structural plastic encapsulating material fully encapsulates the mounting holes 32 & 34 and mounting slots 36 & 38. This provides complete encapsulation of the rigid frame 3 and prevents any chemical or corrosive attack of same.

Referring again to FIG. 4 and also FIGS. 2 and 3, because each end plate 6 & 8 has mounting holes 18 & 20 and mounting slots 22 & 24 slots located therein, which are encapsulated to mounting holes 32 & 34 and mounting slots 36 & 38 respectively, the gap between the ribs 26 serve as the access location for the stair tread mounting bolts and nuts. Since the mounting slots are longer than the ⅝ inches rib opening, the preferred embodiment stair tread further includes cross ribs 30 (four places) which form access openings 28 (four places). These openings allows access to the mounting bolts and nuts which may be used in the mounting slots 36 & 38.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

I claim:

1. A stair tread, comprising:
   a rigid frame, further comprising;
      a first beam, fabricated from square steel tube, having a first end and a second end;
      a second beam, fabricated from square steel tube, having a first end and a second end;
      said first beam and said second beam oriented substantially parallel along a lateral axis of the stair tread;
      a plurality of braces, fabricated from steel plate, welded between said first beam and said second beam;
      a first steel plate, having a first and second circular hole formed therein and further having a first and second slotted opening formed therein;
      said first steel plate welded to said first end of said first beam and further welded to said first end of said second beam;
      a second steel plate, having a first and second circular hole formed therein and further having a first and second slotted opening formed therein;
      said second steel plate welded to said second end of said first beam and further welded to said second end of said second beam;
      a structural plastic material encapsulating said rigid frame wherein said structural plastic comprises a polyurethane and isocyanate blend which is molded about said rigid frame by a reaction injection molding process, and wherein a plurality of ribs, formed integral with said structural plastic, but not encapsulating said rigid frame, and disposed between said plurality of braces and said first and said second steel plates, thereby forming a bar grate tread structure.

2. A stair tread, comprising:

a rigid metal frame having:
   at least a first lateral beam;
   a plurality of braces attached to said lateral beam, and wherein said metal frame is encapsulated with a rigid structural plastic material, and a plurality of structural plastic ribs formed integral with said structural plastic material, but not encapsulating said metal frame, and disposed between said plurality of braces, thereby forming a bar grate tread structure.

3. The stair tread in claim 2, and wherein said structural plastic material is a polyurethane compound.

4. The stair tread in claim 2, and wherein said structural plastic material is a polyurethane and isocyanate blend formed by the reaction injection molding process.

5. A method of fabricating a stair tread having a rigid frame encapsulated with a structural plastic material, wherein the rigid frame has at least a first lateral beam and a plurality of braces attached to the lateral beam, and wherein the encapsulating structural plastic material forms a plurality of ribs formed integral with the structural plastic material which do not encapsulate the rigid frame, thereby forming a bar grate tread structure, comprising the steps of:

inserting the rigid frame into a cavity mold;

injecting a structural plastic material into the cavity mold thereby encapsulating the rigid frame, forming the plurality of ribs, and removing the stair tread from the mold.

* * * * *